US011398925B2

(12) United States Patent
Rentschler et al.

(10) Patent No.: US 11,398,925 B2
(45) Date of Patent: Jul. 26, 2022

(54) MEDIA ACCESS FOR TIME-SENSITIVE AND BEST EFFORTS DATA PACKETS, AND RELATED SYSTEMS, METHODS AND DEVICES

(71) Applicant: Microchip Technology Incorporated, Chandler, AZ (US)

(72) Inventors: Michael Rentschler, Baden-Wuerttemberg (DE); Venkatraman Iyer, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 16 days.

(21) Appl. No.: 16/674,999

(22) Filed: Nov. 5, 2019

(65) Prior Publication Data
US 2020/0351119 A1 Nov. 5, 2020

Related U.S. Application Data

(60) Provisional application No. 62/842,887, filed on May 3, 2019.

(51) Int. Cl.
*H04L 12/40* (2006.01)
*H04L 12/403* (2006.01)
*H04L 47/22* (2022.01)

(52) U.S. Cl.
CPC ...... *H04L 12/40156* (2013.01); *H04L 12/403* (2013.01); *H04L 12/40032* (2013.01); *H04L 47/22* (2013.01)

(58) Field of Classification Search
CPC . H04L 12/40; H04L 12/40156; H04L 12/403; H04L 47/22; H04L 12/4015; H04L 12/815

USPC ......................................................... 370/230
See application file for complete search history.

(56) References Cited

U.S. PATENT DOCUMENTS

| | | | | |
|---|---|---|---|---|
| 6,920,132 B1 * | 7/2005 | Lo | ........................... | H04L 49/40 |
| | | | | 710/316 |
| 6,944,148 B1 * | 9/2005 | Gehring | ................ | H04J 3/1682 |
| | | | | 370/347 |
| 6,975,655 B2 * | 12/2005 | Fischer | ................. | H04L 1/0006 |
| | | | | 370/516 |
| 7,000,031 B2 * | 2/2006 | Fischer | .................. | H04M 11/06 |
| | | | | 709/248 |
| 7,283,551 B1 | 10/2007 | Algie | | |
| 7,298,759 B2 * | 11/2007 | Park | .................... | H04L 47/2433 |
| | | | | 709/224 |

(Continued)

FOREIGN PATENT DOCUMENTS

WO 2019/226585 A1 11/2019

OTHER PUBLICATIONS

International Search Report for International Application No. PCT/US2019/059908, dated Feb. 18, 2020, 11 pages.

(Continued)

*Primary Examiner* — Man U Phan
(74) *Attorney, Agent, or Firm* — TraskBritt

(57) ABSTRACT

Disclosed embodiments relate, generally, to traffic shaping at a network segment having a shared bus. Some embodiments relate to performing aspects of the traffic shaping at a physical layer device. In some cases, transmit timeslot signaling may be tuned at a physical layer device to create transmit timeslots that are aligned with the traffic shaping profile.

27 Claims, 10 Drawing Sheets

(56) References Cited

U.S. PATENT DOCUMENTS

| | | | | |
|---|---|---|---|---|
| 7,406,106 | B2* | 7/2008 | Mallory | H04L 12/4035 370/522 |
| 7,417,949 | B2* | 8/2008 | Weller | H04L 12/4013 370/468 |
| 7,912,045 | B2* | 3/2011 | Page | H04L 5/16 704/229 |
| 8,081,625 | B2* | 12/2011 | Powell | H04L 12/413 370/360 |
| 8,243,752 | B2* | 8/2012 | Barkan | H04L 49/3054 370/465 |
| 9,413,551 | B2* | 8/2016 | Diab | H04L 12/40136 |
| 9,674,317 | B2* | 6/2017 | Zhang | H04L 27/2603 |
| 9,699,000 | B2* | 7/2017 | Powell | H04L 12/413 |
| 10,651,690 | B2* | 5/2020 | Elliott | H02J 50/80 |
| 10,743,347 | B2* | 8/2020 | Elliott | H04L 69/323 |
| 10,764,201 | B2* | 9/2020 | Verbree | H04L 65/80 |
| 10,868,765 | B2* | 12/2020 | Sostawa | H04L 47/24 |
| 10,925,097 | B2* | 2/2021 | Beruto | H04L 47/56 |
| 2002/0006136 | A1* | 1/2002 | Mallory | H04L 1/1809 370/466 |
| 2019/0230705 | A1* | 7/2019 | Beruto | H04L 47/56 |
| 2019/0261420 | A1* | 8/2019 | Pannell | H04W 80/02 |
| 2019/0386763 | A1* | 12/2019 | Rentschler | H04J 3/0688 |
| 2020/0351943 | A1* | 11/2020 | Iyer | H04L 12/40032 |

OTHER PUBLICATIONS

International Written Opinion for International Application No. PCT/US2019/059908, dated Feb. 18, 2020, 11 pages.

Pannell et al.: "Quality of Service PLCA", vol. 802.1, No. v02, May 24, 2018, pp. 1-37, XP068126773, Piscataway, NJ USA.

Rentschler et al.: "Time Synchronized Collision Avoidance in Multidrop Networks", vol. 802.3cg, Oct. 16, 2017, pp. 1-10, XP068120867, Piscataway NJ USA.

* cited by examiner

MEDIA ACCESS FOR TIME-SENSITIVE AND BEST EFFORTS DATA PACKETS, AND RELATED SYSTEMS, METHODS AND DEVICES

CROSS-REFERENCE TO RELATED APPLICATION

This application claims the benefit under 35 U.S.C. § 119(e) of U.S. Provisional Patent Application Ser. No. 62/842,887 filed May 3, 2019, the contents and disclosure of which is hereby incorporated herein in its entirety by this reference.

FIELD

The present disclosure relates generally to single pair Ethernet networks, and more specifically, some embodiments relate to systems and methods for media access at single pair Ethernet network that supports best effort traffic and time-sensitive traffic.

BACKGROUND

Interconnects are widely used to facilitate communication among devices of a network. Generally speaking, electrical signals are transmitted on a physical medium (e.g., a bus, a coaxial cable, or a twisted pair—but generally referred to simply as a "line") by the devices coupled to the physical medium.

According to the Open Systems Interconnection model (OSI model), Ethernet-based computer networking technologies use baseband transmission (i.e., electrical signals are discrete electrical pulses) to transmit data packets and ultimately messages that are communicated among network devices. According to the OSI model, specialized circuitry called a physical layer (PHY) device or controller is used to interface between an analog domain of a line and a digital domain of a data link layer (also referred to herein simply as a "link layer") that operates according to packet signaling. While the data link layer may include one or more sublayers, in Ethernet-based computer networking, a data link layer typically includes at least a media access control (MAC) layer that provides control abstraction of the physical layer. By way of example, when transmitting data to another device on a network, a MAC controller may prepare frames for the physical medium, add error correction elements, and implement collision avoidance. Further, when receiving data from another device, a MAC controller may ensure integrity of received data and prepare frames for higher layers.

There are various network topologies that implement physical layers and link layers (and may include other layers, without limitation). The Peripheral Component interconnect (PCI) standard and the Parallel Advanced Technology Attachment (Parallel ATA), both around since the early 1990's, may implement a multidrop bus topology. The trend since the early 2000's has been to use point-to-point bus topologies, for example, the PCI Express standard and the Serial ATA (SATA) standard implement point-to-point topologies.

A typical point-to-point bus topology may implement lines between each device (e.g., dedicated point-to-point) or lines between devices and switches (e.g., switched point-to-point, without limitation). In a multidrop topology, a physical medium is a shared bus and each network device is coupled to the shared bus, for example, via a circuit chosen based on the type of physical medium (e.g., coaxial or twisted pair, without limitation).

Point-to-point bus topologies, such as a dedicated point-to-point topology or a switched point-to-point topology, require more wires and more expensive material than multidrop topologies due, in part, to the greater number of links between devices. In certain applications, such as automotive, there may be physical constraints that make it difficult to directly connect devices, and so a topology that does not require, or does not require as many, direct connections (e.g., a multidrop topology, without limitation) in a network or a sub-network may be less susceptible to such constraints.

Devices that are on a baseband network (e.g., a multidrop network without limitation) share the same physical transmission medium (e.g., the shared bus), and typically use the entire bandwidth of that medium for transmission (stated another way, a digital Signal used in baseband transmission occupies the entire bandwidth of the media). As a result, only one device on a baseband network may transmit at a given instant. So, media access control methods are used to handle contention for a shared bus.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
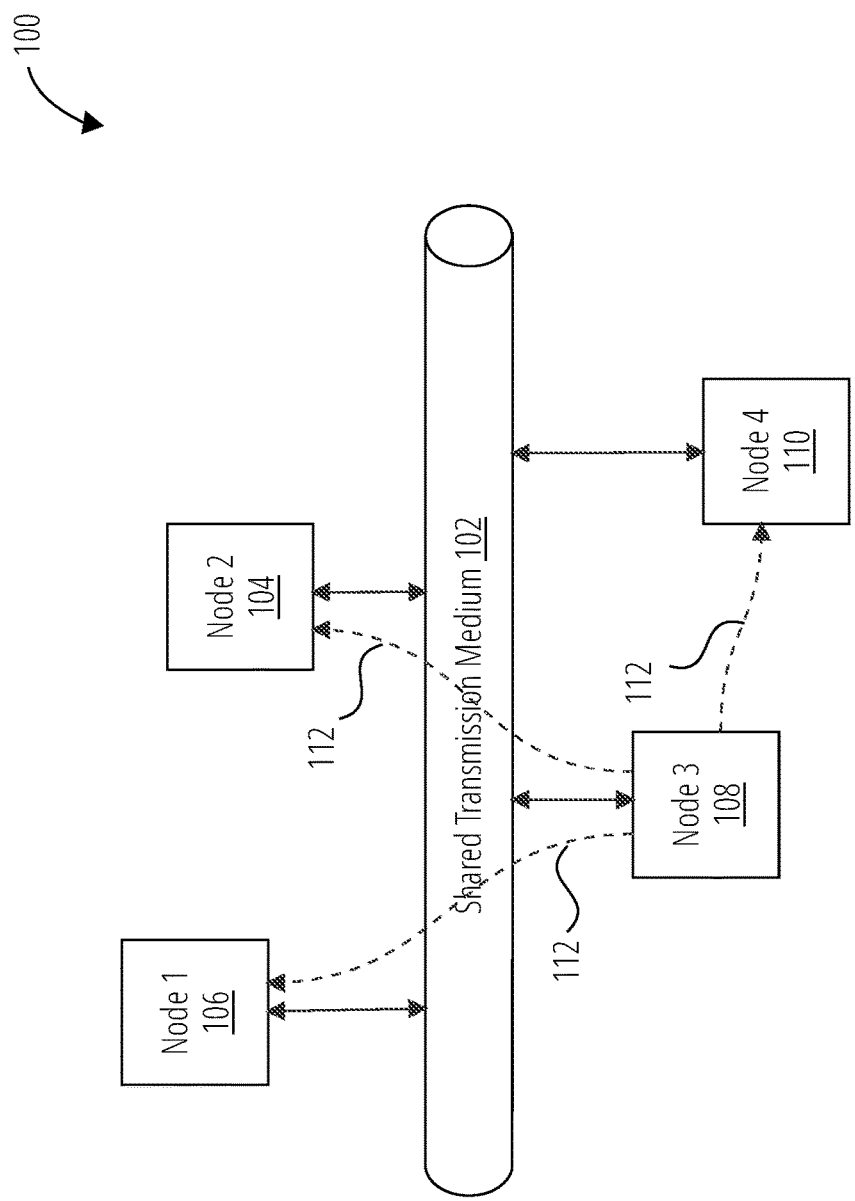
FIG. 1 illustrates a network segment in accordance with one or more embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," "for example," and "e.g.," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A vehicle, such as an automobile, a truck, a bus, a ship, and/or an aircraft, may include a vehicle communication network. The complexity of a vehicle communication network may vary depending on a number of electronic devices within the network. For example, an advanced vehicle communication network may include various control modules for, for example, engine control, transmission control, safety control (e.g., antilock braking), and emissions control. To support these modules, the automotive industry relies on various communication protocols.

10SPE (i.e., 10 Mbps Single Pair Ethernet) is a network technology specification currently under development by the Institute of Electrical and electronics Engineers (IEEE) as specification IEEE 802.3Cg™. 10SPE may be used to provide a collision free, deterministic transmission on a multi-drop bus of a multi-drop network or a mixed network. The 10SPE specification includes an optional physical level collision avoidance (PLCA) reconciliation sublayer, which is used to avoid physical collision on a multi-drop bus.

The inventors of this disclosure now understand that PLCA is suitable for best efforts (BE) traffic, which is traffic that is irregular (e.g., firmware updates, audio control signals, without limitation) and latency is not important, but where starvation should be avoided. Starvation is a scenario where a process (e.g., a node, a 10SPE Ethernet Physical Layer Transceiver (PHY), queue, or even a data packet, without limitation) is perpetually locked-out of transmitting. The inventors of this disclosure now understand that PLCA typically has too much latency jitter for time-sensitive (TS) traffic, which is traffic that is regular (e.g., audio frames, sensor polls, without limitation) and deterministic latency is important.

One or more embodiments relate, generally, to systems, methods, and devices for performing data transmissions on a shared bus according to a traffic shaping profile. In some embodiments, a bus cycle of a traffic shaping profile may include non-overlapping timeslots. Each timeslot may be assigned to a specific node that is time aware, that is, is aware of a schedule and its assigned timeslot(s), and that uses a real-time clock (RTC) synchronized to a same common clock as the RTC of other nodes in the network segment to enforce the schedule.

One or more embodiments relate, generally, to a physical layer (PHY) device configured to enforce at least part of a traffic shaping profile, and/or to enforce priority schemes to address contention for shared timeslots, and systems including the same. In one embodiment, a PHY may be configured to perform such enforcement using transmit timeslot signaling. A PHY may be configured to assert emulated carrier sense signaling (e.g., active low, without limitation) to cause a MAC that is configured for collision detection and/or avoidance (e.g., a CSMA/CD MAC, without limitation) to enter a deferral state outside assigned timeslots and then de-assert emulated carrier sense signaling (e.g., in-active high, without limitation) to cause the MAC to exit the deferral state during assigned timeslots.

FIG. 1 shows a block diagram a network segment 100 in accordance with one or more embodiments of this disclosure. In the example shown in FIG. 1, network segment 100 includes node 106, node 104, node 108 and node 110, each such node operatively coupled to shared transmission medium 102.

As non-limiting examples, network segment 100 may be a segment of a multidrop network, a segment of a multidrop sub-network, a segment of a mixed media network, or a combination or sub-combination thereof. As non-limiting examples, network segment 100 may be, be part of, or include one or more of a microcontroller-type embedded system, a user-type computer, a computer server, a notebook computer, a tablet, a handheld device, a mobile device, a wireless earbud device or headphone device, a wired earbud or headphone device, an appliance sub-system, lighting sub-system, sound sub-system, building control systems, residential monitoring system (e.g., for security or utility usage, without limitation), elevator system or sub-system, public transit control system (e.g., for above ground train, below ground train, trolley, or bus, without limitation), an automobile system or automobile sub-system, or an industrial control system, without limitation.

In one or more embodiments, node 106, node 104, node 108 and node 110 are configured to communicate TS and/or BE data packets over shared transmission medium 102. In the embodiment shown in FIG. 1, node 108 is configured as a master node.

Figure 2:
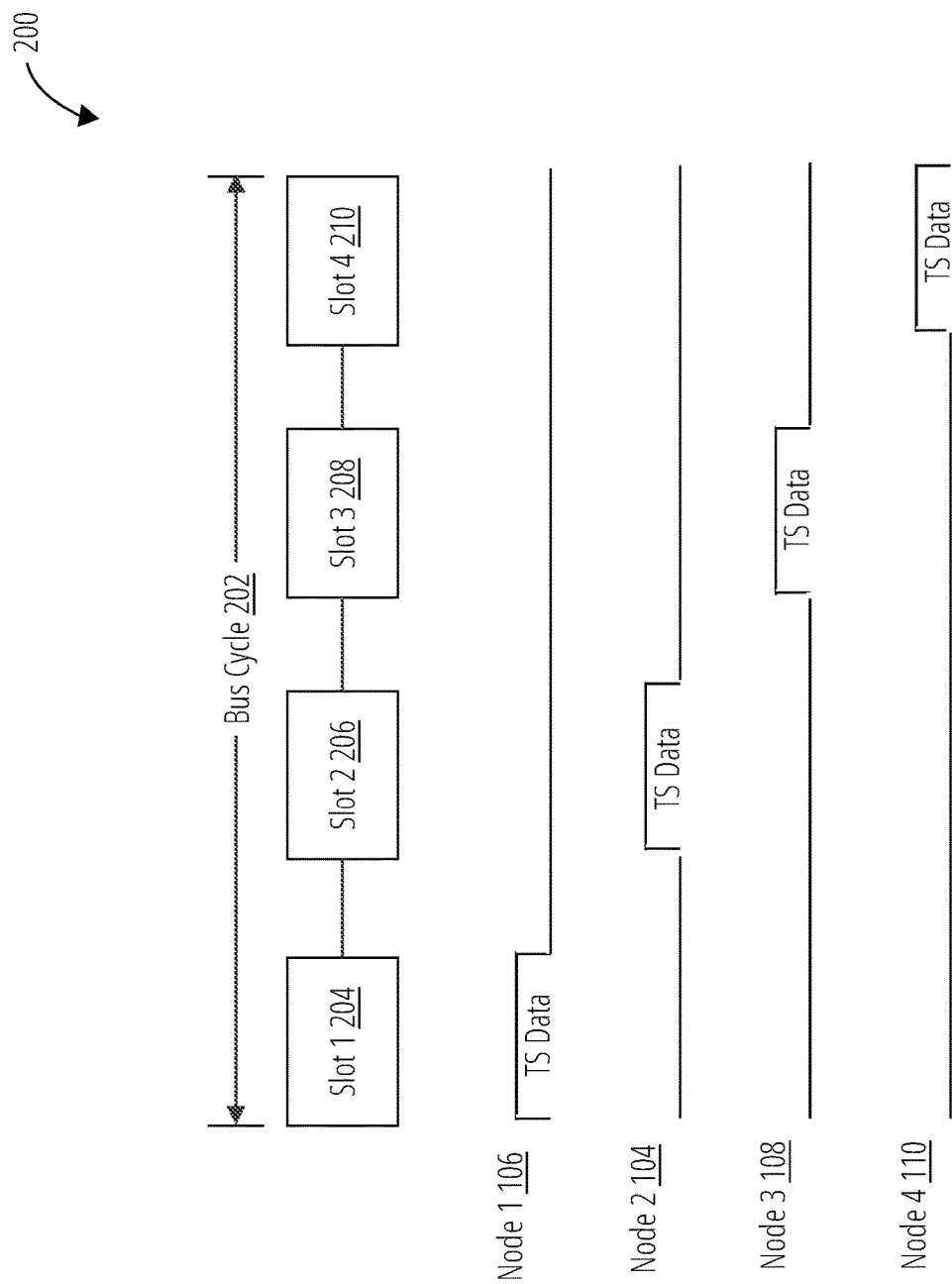
FIG. 2 illustrates a data transmission in accordance with one or more embodiments.

FIG. 2 shows a diagram of a portion of a data transmission 200 according to a traffic shaping profile at a shared bus, in accordance with one or more embodiments.

As shown in the example embodiment of FIG. 2, a period of time referred to herein as a "bus cycle," is divided into a number sub-periods of time referred to herein as "timeslots," and, this example, each such timeslot is assigned to one, and only one, of node 106, node 104, node 108 and node 110. In FIG. 2, a bus cycle 202 of data transmission 200 is shown, and bus cycle 202 includes four timeslots, timeslot 204, timeslot 206, 208, and timeslot 210, assigned to node 106, node 104, node 108 and node 110, respectively. Timeslots assignable to one, and only one, node or data queue of a node are referred to herein as "exclusive timeslots." Timeslots assignable to one or more nodes or one or more data queues of nodes are referred to herein as "shared timeslots."

In one embodiment, timeslot 204, timeslot 206, timeslot 208, and timeslot 210 are periodic and non-overlapping. As discussed later, to implement bus cycle 202, each node may be configured to use a respective local clock synced to a common clock using a time synchronization technique such as an IEEE 1588 time distribution system, without limitation. For example, in FIG. 1, node 106, node 104, node 108, and node 110 implement a time distribution system, namely, node 108 is a node master of a time distribution system of network segment 100 that distributes clock 112 to node 106, node 104, and node 108.

In one embodiment, a TS queue and a BE queue are maintained at a link layer, e.g., at a media access control (MAC) device or a buffer manager of a node, and scheduled (as explained herein) to transmit during respective periodic timeslots (i.e., each queue has an assigned timeslot in a bus cycle). Notably, in some cases, it is expected that a node may not use a scheduled timeslot to transmit data.

Data transmission 200 of FIG. 2, which implements time aware scheduling, should typically exhibit deterministic latency, and, in most cases, should be suitable for TS traffic where preserving latency determinism is important. However, in some cases, a network segment may support traffic having more than one quality of service (QoS) designation, as a non-limiting example, both TS traffic and BE traffic, and so a different traffic shaping protocol may be appropriate.

Figure 3:
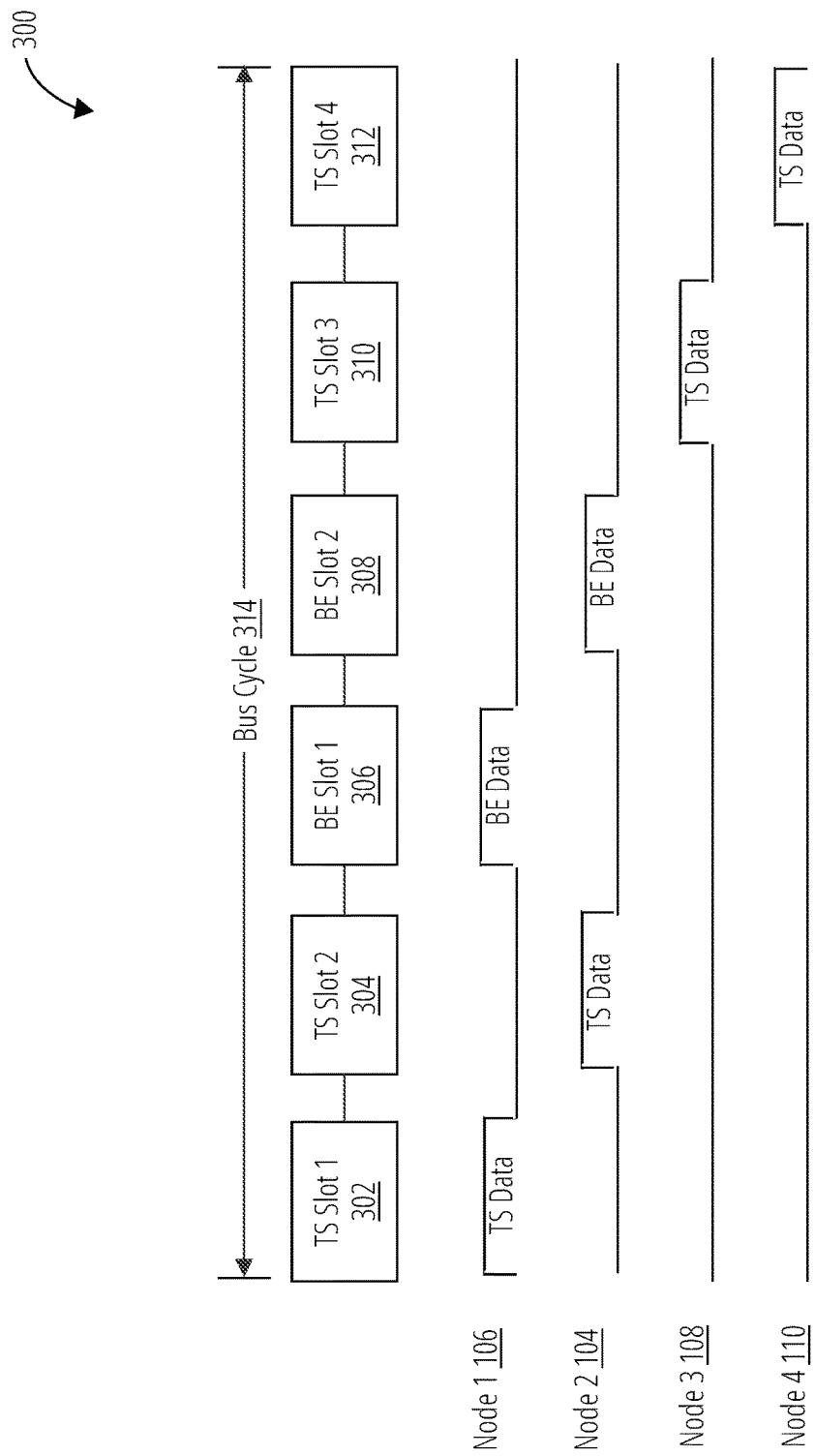
FIG. 3 illustrates a data transmission in accordance with one or more embodiments.
Figure 4:
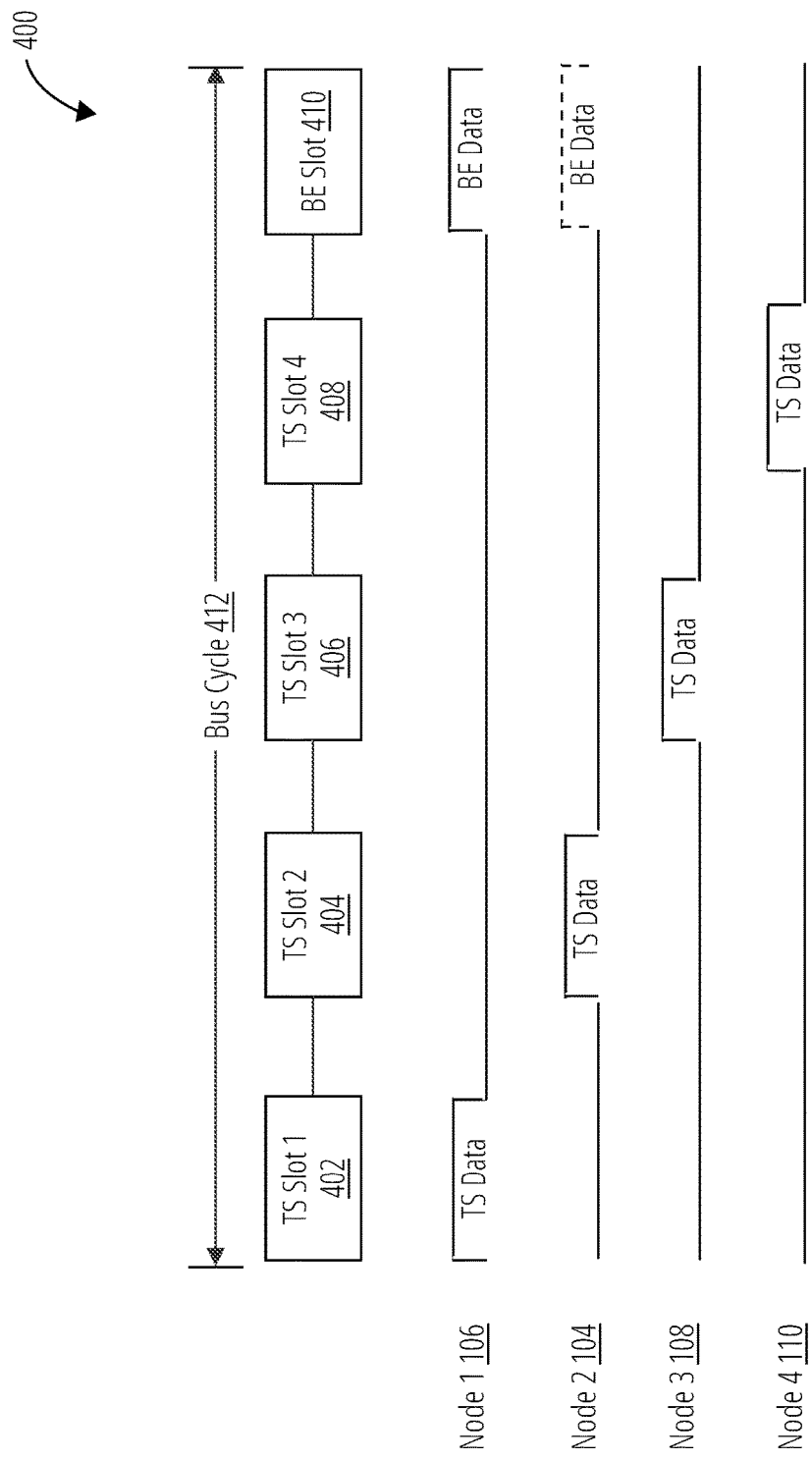
FIG. 4 illustrates a data transmission in accordance with one or more embodiments.

FIG. 3 and FIG. 4 show diagrams for portions of embodiments of data transmissions at a shared bus. The data transmissions are performed according to traffic shaping profiles for transporting BE traffic and TS traffic in accordance with one or more embodiments.

FIG. 3 shows a diagram of a portion of a data transmission 300 at a shared bus according to an embodiment of a traffic shaping profile where a bus cycle includes a number of exclusive timeslots, and a node is assigned a first exclusive timeslot for traffic associated with a first quality of service designation and assigned a second exclusive timeslot for traffic associated with a second quality of service designation.

In the embodiment of FIG. 3, bus cycle 314 includes exclusive timeslots for TS traffic (i.e., TS timeslot 302, TS timeslot 304, and TS timeslot 310 and TS timeslot 312), as well as exclusive timeslots for BE traffic (i.e., BE timeslot 306 and BE timeslot 308). Each node is assigned a TS timeslot, here, node 106 is assigned TS timeslot 302, node 104 is assigned TS timeslot 304, node 108 is assigned TS timeslot 310, and node 110 is assigned TS timeslot 312. Moreover, node 106 and node 104 are assigned BE timeslot 306 and BE timeslot 308, respectively. Notably, node 108 and node 110 are not assigned timeslots for BE data as not all nodes necessarily have BE data (or, in some cases, TS data). So, in FIG. 3, bus cycle 314 has not been set up to include BE timeslots for those nodes, i.e., node 110 and node 108.

Also shown in FIG. 3 is a timing diagram showing data sent by node 104, node 106, node 108 and node 110 at each respective node's assigned exclusive timeslots during bus cycle 314.

In some cases, a traffic scheduling scheme that assigns node exclusive timeslots may result in wasted bandwidth in a network segment. As a non-limiting example, wasted bandwidth may result if a node uses an exclusive timeslot infrequently but other nodes are idle during instances of the node's unused exclusive timeslot. Stated another way, end-to-end latency may be directly proportional to a number of timeslots in a bus cycle, so if an exclusive timeslot is used infrequently, then latency that adds to end-to-end latency may be present without necessarily realizing a gain in bandwidth.

FIG. 4 shows a diagram of a portion of a data transmission 400 at a shared bus during a bus cycle that conforms to a traffic shaping profile that defines a number of shared timeslots for traffic of a specific QoS designation. In a contemplated use case, a bus cycle may be set up with a number (i.e., one or more) of shared timeslots and then nodes may be assigned (e.g., by a master node) to one or more of the number of shared timeslot as needed. Stated another way, additional nodes may be assigned to a shared timeslot without necessarily adding additional timeslots to a bus cycle.

In the embodiment of FIG. 4, bus cycle 412 includes exclusive timeslots for TS traffic (i.e., TS timeslot 402, TS timeslot 404, TS timeslot 406, and TS timeslot 408), and a shared timeslot for BE traffic (i.e., shared BE timeslot 410). Node 106, node 104, node 108, and node 110 are assigned TS timeslot 402, TS timeslot 404, TS timeslot 406, and TS timeslot 408, respectively, for TS traffic, and node 106 and node 104 are assigned shared BE timeslot 410 for BE traffic.

Notably, only one node may transmit data at a shared bus during shared BE timeslot 410 (a collision would occur if two or more nodes transmitted at the shared bus during a shared timeslot). So, in the embodiment of FIG. 4, node 106 accesses the shared bus during shared BE timeslot 410, and node 104, which also has BE data, yields (as denoted by the dashed lines around BE data at node 104) shared BE timeslot 410 (in this case to node 106). Priority schemes for claiming and/or yielding shared timeslots are discussed later herein.

While FIG. 4 shows one shared timeslot in a bus cycle 412, namely shared BE timeslot 410, bus cycle 412 may comprise a number of shared timeslots. Moreover, in cases where a network segment supports traffic associated with different QoS designations, bus cycle 412 may include a number of shared timeslots for each supported QoS designation.

While FIG. 4 shows the shared timeslot (e.g., shared BE timeslot 410) is the same length as the exclusive timeslots (e.g., TS timeslot 408), in some cases traffic associated with different types of QoS can include different sized data packets. As a non-limiting example, BE data packets may be longer (in bits) than TS data packets. Moreover, BE data packets for a first application may be longer than BE data packets for a second application. So, nodes and/or queues assigned to a shared timeslot may send different length data packets. In some embodiments, a length of a shared timeslot may be selected to be at least as long as the longest data packet expected to be transmitted during the shared timeslot.

Figure 5:
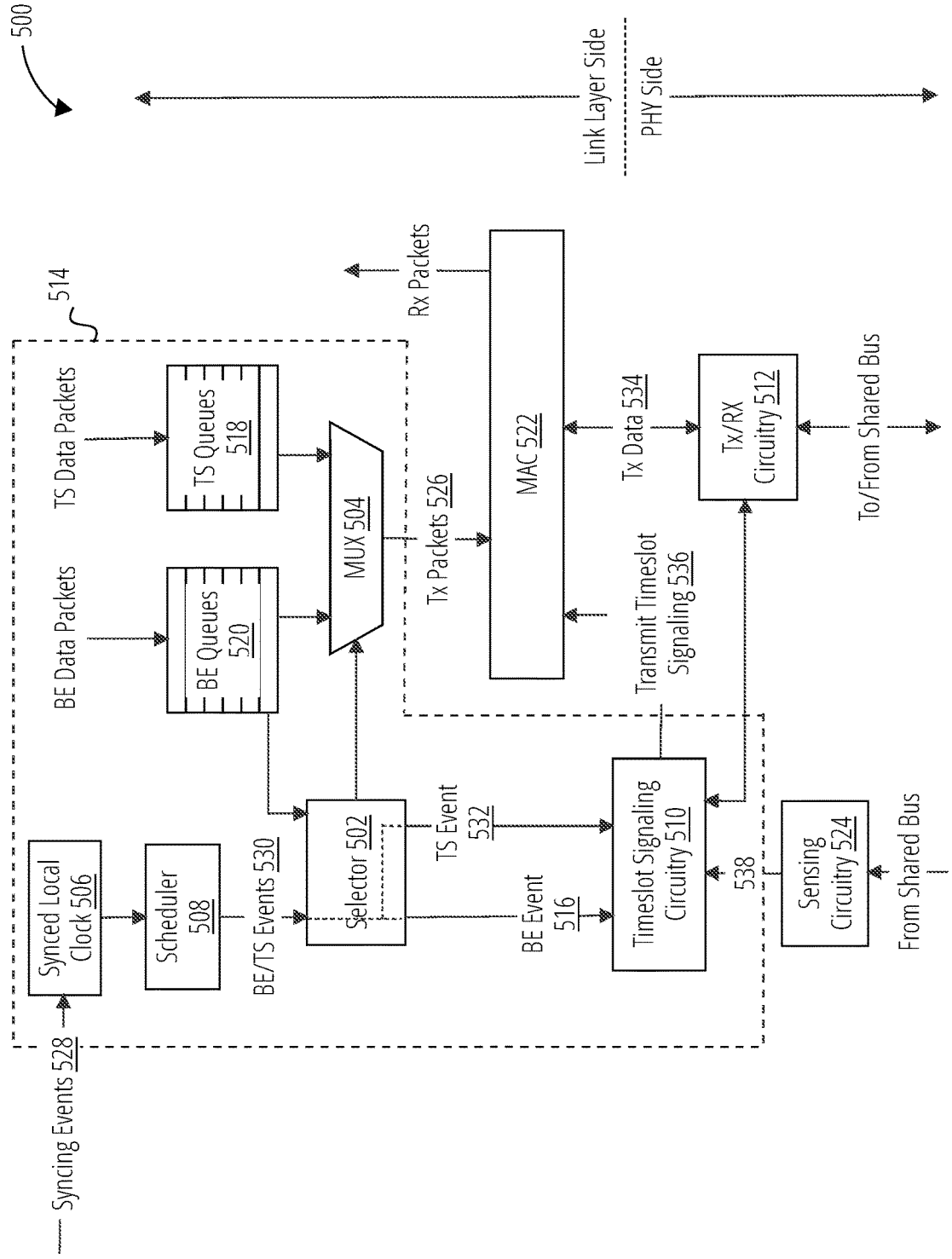
FIG. 5 illustrates a transmission system in accordance with one or more embodiments.

FIG. 5 shows a functional block diagram of an embodiment of a transmission system 500 that includes a traffic shaping sub-system 514 in accordance with one or more embodiments.

In the embodiment of transmission system 500 shown in FIG. 5, data packets are provided to MAC 522 according to a traffic profile implemented by traffic shaping sub-system 514. Generally, frames at MAC 522 are assigned to data packets at BE queue 520 or TS queue 518 based, at least in part, on a traffic schedule implemented by scheduler 508. As non-limiting examples, traffic shaping sub-system 514 may be configured to perform traffic shaping according to one or more of the traffic shaping profiles discussed herein with reference to FIG. 2, FIG. 3, and FIG. 4.

Tx packets 526 are provided to MAC 522 by traffic shaping sub-system 514 on a periodic schedule that is managed by scheduler 508. The schedule may be based, at least in part, on a traffic profile implemented by traffic shaping sub-system 514 and/or a network segment with which transmission system 500 is configured to operate. Each Tx packets 526 may include either BE data packets or TS data packets that are provided by BE queue 520 and TS queue 518, respectively.

Scheduler 508 may be configured, generally, to notify selector 502 of scheduled timeslots assigned to BE queue 520 and/or TS queue 518. Scheduler 508 may be configured to provide BE/TS events 530 to selector 502. BE/TS events 530 may include a BE event 516 or a TS event 532, for indicating a BE timeslot and a TS timeslot, respectively. Scheduler 508 may be configured to use a local clock (i.e., synced local clock 506) to detect scheduled timeslots. In some embodiments, scheduler 508 may include one or more event generators (not shown) that are configured to generate events that indicate scheduled timeslots for selector 502. In some embodiments, synced local clock 506 may be configured to be synchronized to a common clock of one or more network segments in response to syncing events 528. In some embodiments, syncing events 528 may be generated and used to synchronize synced local clock 506 according to a syncing protocol, e.g., IEEE 1588 precision time protocol, without limitation.

Selector 502 may be configured to propagate BE event 516 upon detecting BE data in BE queue 520, and propagate TS event 532 (whether or not there is TS data in TS queue 518).

BE data packets and TS data packets may be selected by selector 502 to be Tx packets 526 in response to BE/TS events 530. More specifically, BE queue 520 and TS queue 518 may be selected by selector 502 via MUX 504 in response to receiving BE event 516 and TS event 532, respectively.

In general, queues used to hold data packets at traffic shaping sub-system 514 may be categorized as deterministic latency data queues and non-deterministic latency data queues. In the embodiment of traffic shaping sub-system 514 shown in FIG. 5, TS queue 518 is a deterministic latency data queue and BE queue 520 is a non-deterministic latency data queue.

As discussed herein, in cases of traffic shaping protocols that use shared timeslots for non-deterministic data, it is not necessary to select BE queue 520 unless there is a BE data packet at BE queue 520. So, in some embodiments, selector 502 may be configured to select BE queue 520 in response to receiving a BE event in BE/TS events 530 and to detecting that there are one or more BE data packets at BE queue 520.

In FIG. 5, a link layer side and a PHY side of transmission system 500 are shown, with a portion of traffic shaping sub-system 514 and MAC 522 being included at the link layer side. Included at the PHY side are timeslot signaling circuitry 510, Tx/RX Circuitry 512, and sensing circuitry 524. Tx/RX Circuitry 512 may be operatively coupled to MAC 522 and a shared bus (not shown) and configured, generally, to move receive data and transmit data between the shared bus and MAC 522. Sensing circuitry 524 may be configured, generally, to provide carrier sense signals 538, a signal indicative of carrier activity at a shared bus operatively coupled to sensing circuitry 524 (not shown).

In one or more embodiments, timeslot signaling circuitry 510 may form a portion of traffic shaping sub-system 514. Timeslot signaling circuitry 510 may be configured, generally, to provide transmit timeslot signaling 536 to MAC 522 and to tune the transmit timeslot signaling 536 to enforce a traffic shaping profile, and more specifically, to enforce a traffic scheduling scheme of the traffic shaping profile. In various embodiments, MAC 522 may be configured to begin a data transmission during a transmit timeslot, and to be in a deferral state (i.e., waiting for a transmit timeslot) otherwise. MAC 522 is configured to detect a transmit timeslot while transmit timeslot signaling 536 is asserted, and wait for a transmit timeslot while transmit timeslot signaling 536 is de-asserted.

In some embodiments, timeslot signaling circuitry 510 may be configured to assert/de-assert transmit timeslot signaling 536 to enforce a traffic shaping profile of traffic shaping sub-system 514. More specifically, timeslot signaling circuitry 510 may be configured to assert transmit timeslot signaling 536 in response to at least some BE event 516 and TS event 532, but otherwise de-assert transmit timeslot signaling 536. In this manner, timeslot signaling circuitry 510 may be configured to assert transmit timeslot signaling 536 during assigned timeslots, and de-assert transmit timeslot signaling 536 outside of assigned timeslots. From the perspective of MAC 522 the assigned timeslots correspond to transmit timeslots. In some embodiments, timeslot signaling circuitry 510 may be configured to suppress (i.e., continue to de-assert transmit timeslot signaling 536 even though a BE event 516 or TS event 532 was received) in response to carrier activity signaling 538 indicating an active carrier at a shared bus.

As discussed herein, in some cases a traffic shaping profile may include a shared timeslot, including for non-deterministic data packets such as BE data packets, without limitation. One or more embodiments relate, generally, to a traffic shaping sub-system 514 that is configured to implement a priority scheme to address contention for a shared timeslot of a traffic shaping profile. Some embodiments relate, generally, to a PHY configured to assert/de-assert transmit timeslot signaling in response to determining that the local node won or lost the timeslot according to a priority scheme.

Figure 6:
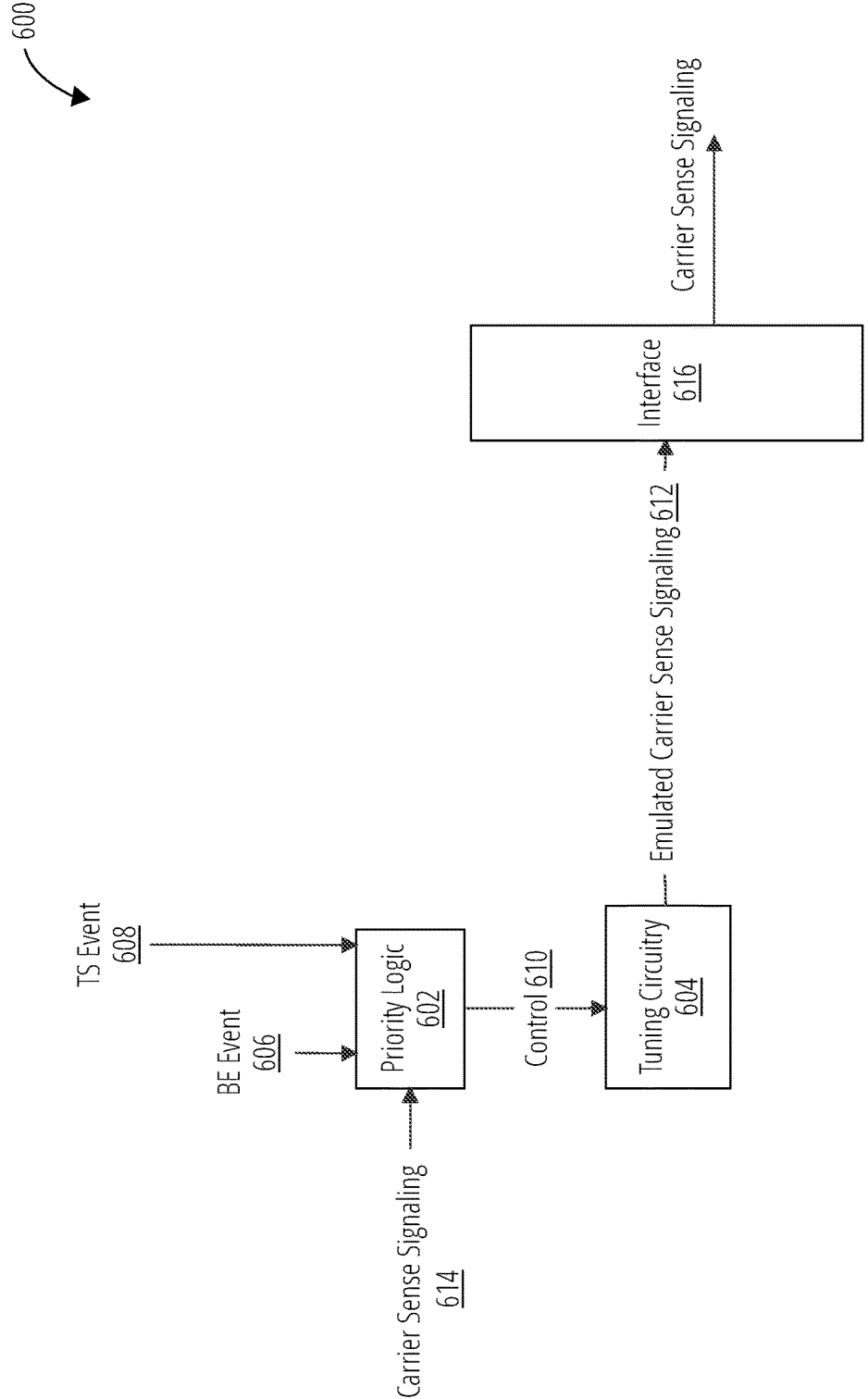
FIG. 6 illustrates a timeslot signaling circuitry in accordance with one or more embodiments.

As discussed above, in some embodiments, transmit timeslot signaling may include emulated carrier sense signaling. FIG. 6 shows a block diagram of a timeslot signaling circuitry 600 for performing selective assertion/de-assertion of emulated carrier sense signaling according to a priority scheme, in accordance with one or more embodiments. Timeslot signaling circuitry 600 may be used, as a non-limiting example, to implement timeslot signaling circuitry 510 of FIG. 5.

In one or more embodiments, timeslot signaling circuitry 600 may include priority logic 602 and tuning circuitry 604. Priority logic 602 may be configured, generally, to enforce one or more priority schemes to address contention for a shared timeslot. In a contemplated use case, upon receiving BE event 516, priority logic 602 may be configured to determine if the local node loses or wins a shared timeslot according to a priority scheme. If priority logic 602 determines that a local node loses, priority logic 602 is configured to assert emulated carrier sense signaling 612 at tuning circuitry 604 by way of control 610. If priority logic 602 determines that a local node wins, priority logic 602 is configured to de-assert emulated carrier sense signaling 612 (via tuning circuitry 604).

Emulated carrier sense signaling 612 is asserted, by timeslot signaling circuitry 600, whenever transmission is not allowed, and thus de-assertion of emulated carrier sense signaling 612 may be understood to be the same as assertion of transmit timeslot signaling 536 of FIG. 5.

In some embodiments, emulated carrier sense signaling 612 may be provided to interface 616 that includes exclusive or non-exclusive carrier sense signaling. As a non-limiting example, interface 616 may implement a Media Independent Interface (MII), a Reduced MII (RMII), or a variation thereon, which interface may include a pin for exclusive or non-exclusive carrier sense signaling (as the case may be) asserted/de-asserted in response to emulated carrier sense signaling 612.

In some embodiments, one or more of TS event 608 and BE event 606 may arrive at priority logic 602 by way of an event path that passes through interface 616 (path not shown). In some embodiments, one or more of TS event 608 and BE event 606 may arrive at priority logic 602 by way of an event path that does not pass through interface 616.

Figure 7:
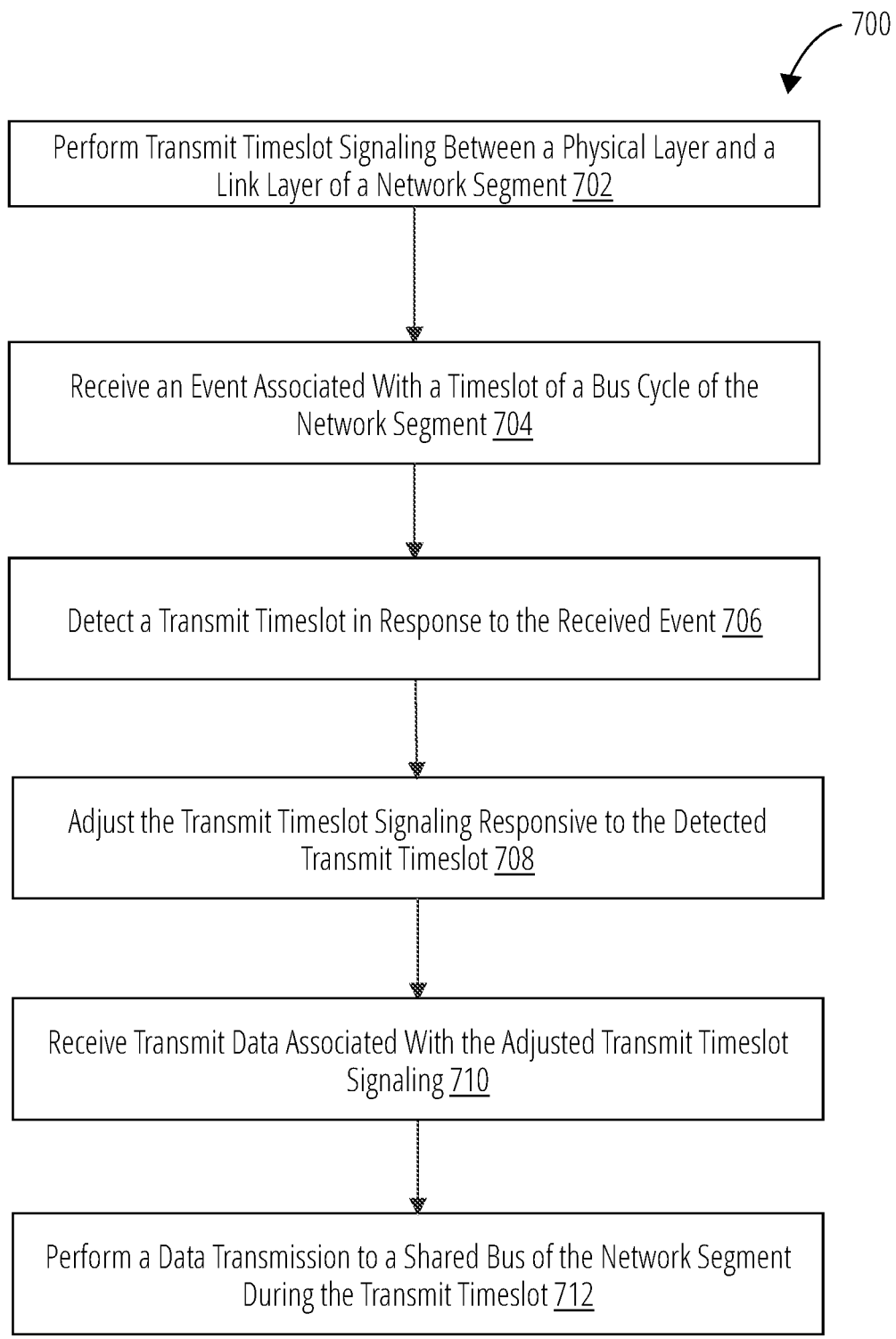
FIG. 7 shows a process for shaping traffic at a network segment in accordance with one or more embodiments.

FIG. 7 shows a flowchart for a process 700 for performing traffic shaping for an Ethernet segment, in accordance with one or more embodiments of the disclosure, and which is performed, as a non-limiting example, by transmission system 500.

In operation 702, process 700 performs transmit timeslot signaling between a physical layer and a link layer of a network segment. In one embodiment, transmit timeslot signaling may include asserting and/or de-asserting a signal for indicating a timeslot. In one embodiment, transmit timeslot signaling may include tuning carrier sense signaling to indicate that a carrier at a shared bus of the network segment is active.

In operation 704, process 700 receives an event associated with a timeslot of a bus cycle of the network segment. As a non-limiting example, the event may include an event for an exclusive timeslot or an event for a shared timeslot. In some embodiments, the timeslot may be one of a number of scheduled timeslots included in the bus cycle. In some embodiments, the generation of the event may be synced to a clock common to multiple nodes of the network segment.

In operation 706, process 700 detects a transmit timeslot in response to the event received in operation 702. The detected transmit timeslot may be an exclusive or a shared timeslot. In one embodiment, detecting the transmit timeslot may include first detecting that the timeslot signaling should not be suppressed, as a non-limiting example, because the timeslot is a shared timeslot, is a node associated with process 900 does not have a high enough priority or is configured to yield timeslot (as discussed later).

In operation 708, process 700 adjusts the transmit timeslot signaling in response to detecting the transmit timeslot in operation 706. In one embodiment, adjusting the transmit timeslot signaling may include tuning carrier sensing signaling between a physical layer and a link layer of a node.

In one embodiment, tuning carrier sense signaling may include asserting and/or de-asserting an emulated carrier sense signaling.

In operation 710, process 700 receives transmit data for transmission to the shared bus of the network segment. Notably, the transmit data may be received prior to timeslot and/or during the transmit timeslot.

In operation 712, process 700 performs a data transmission of the transmit data received during operation 710 during the transmit timeslot.

Figure 8:
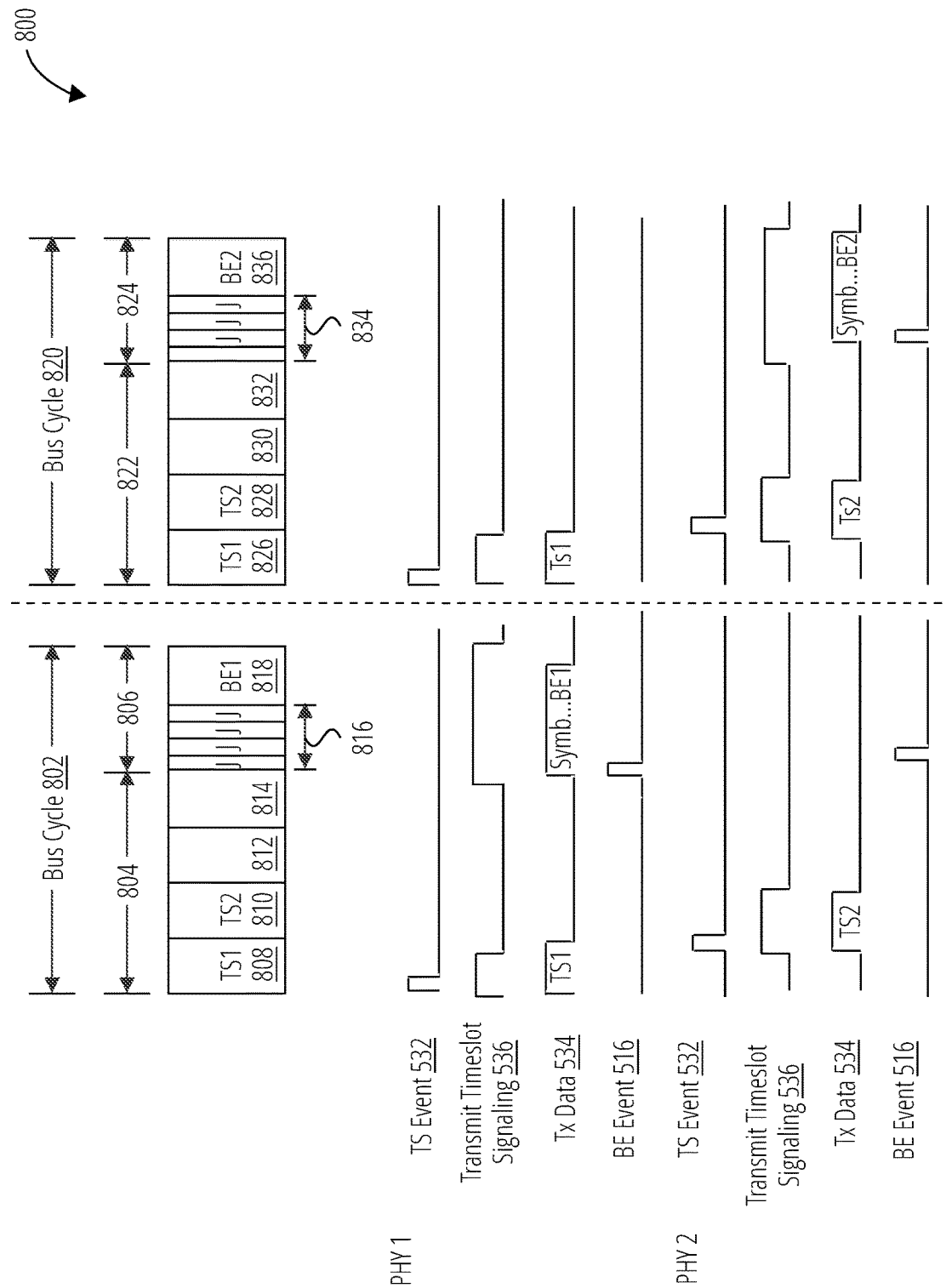
FIG. 8 illustrates a scheduled data transmission in accordance with one or more embodiments.

FIG. 8 shows a timing diagram of a scheduled data transmission 800 at shared transmission medium 102. In FIG. 8 the scheduled data transmission 800 occurs during bus cycle 802 and bus cycle 820, which roughly correspond to bus cycle 412 of FIG. 4.

In FIG. 8, a respective portion of bus cycle 802 and bus cycle 820 includes timeslots for time-sensitive data, i.e., TS portion 804 and TS portion 822, respectively, and a respective portion of bus cycle 802 and bus cycle 820 includes a shared timeslot for best effort data, i.e., BE portion 806 and BE portion 824, respectively. BE portion 806 and BE portion 824 include respective timeslots for announcements (discussed later), i.e., announcement portion 816 and announcement portion 834, and include respective timeslots for BE packets, BE slot 818 and BE slot 836, respectively.

Also shown in FIG. 8 are timing diagrams for PHYs of two different nodes (e.g., node 104 and node 106 of network segment 100 of FIG. 1, without limitation), namely, PHY 1 and PHY 2. In the examples contemplated by FIG. 8, during bus cycle 802, the respective nodes of PHY 1 and PHY 2 contend for the BE slot 818, and during bus cycle 820 contend for BE slot 836.

In one or more embodiments, BE event 516 pulses may be received at respective PHYs across network segment 100 in a staggered manner. When BE event 516 pulses are received in a staggered manner at respective PHYs, each PHY should have an opportunity to check for an announcement by another PHY claiming the shared BE timeslot, and if an announcement is not detected, send its own announcement that it is claiming the shared BE timeslot. In a case of staggered BE event 516 pulses, each BE event 516 pulse is separated in time from the previous BE event 516 pulse by an amount of time referred to herein as an "offset." So, in the example shown in FIG. 8, BE event 516 pulse at PHY 1 is received before BE event 516 pulse at PHY 2 is received.

The timing diagrams for PHY 1 and PHY 2 include signals observable at timeslot signaling circuitry 600 of the respective PHY 1 and PHY 2 during bus cycle 802 and bus cycle 820. Shown are signals for transmit timeslot signaling 536, TS event 532 and BE event 516, of FIG. 5 and FIG. 6. Also shown are signals for tx data 534 (FIG. 5) received at PHY 1 and PHY 2 during bus cycle 802 and bus cycle 820. While BE event 516 and TS event 532 are shown in FIG. 8 as a single pulse, they may be one or more pulses, and in one embodiment, a BE timeslot event and/or TS timeslot event may include a number of successive signal pulses.

During bus cycle 802, PHY 1 receives TS event 532, which indicates that TS timeslot 808 is about to start. PHY 1 detects transmit timeslot 808 in response to receiving a TS event 532 pulse In response to detecting transmit timeslot 808, PHY 1 asserts its transmit timeslot signaling 536, which creates a transmit timeslot for its MAC to send TS data. PHY 1 receives TS data TS1 from the MAC (transfer not shown), and provides TS1 to the shared bus during TS timeslot 808. Upon providing TS1, PHY 1 de-asserts its transmit timeslot signaling 536, which ends the transmit timeslot for its MAC, and continues to de-assert its transmit timeslot signaling 536 during the remaining timeslots of TS portion 804 (i.e., TS timeslot 810, TS timeslot 812, and TS timeslot 814).

Notably, in cases where transmit timeslot signaling 536 includes emulated carrier sense signaling, a MAC may enter a deferral state in response to an asserted emulated carrier sense signaling and enter a transmit state in response to a de-asserted emulated carrier sense signaling.

During TS timeslot 808, PHY 2 de-asserts transmit timeslot signaling 536 so, its MAC will stay in a deferral state. PHY 2 detects transmit timeslot 810 in response to receiving a TS event 532 pulse. In response to detecting transmit timeslot 810, PHY 2 asserts its transmit timeslot signaling 536, which creates a transmit timeslot for its MAC to send TS data. PHY 2 receives TS data, TS2, from the MAC (transfer not shown) and provides TS2 to the shared bus during TS timeslot 810. Upon providing TS2, PHY 2 de-asserts its transmit timeslot signaling 536, which ends the transmit timeslot for its MAC. PHY2 continues to assert its transmit timeslot signaling 536 during the remaining timeslots of TS portion 804 (i.e., TS timeslot 812 and TS timeslot 814).

Notably, PHY 1 and PHY 2 should not have to check for carrier activity at shared transmission medium 102 before sending TS1 and TS2 because of the traffic shaping profile being enforced. Stated another way, according to the traffic shaping profile in this embodiment (i.e., periodic scheduling of non-overlapping timeslots), PHYs do not share TS timeslots, so only one PHY receives a TS event 532 pulse per TS timeslot. However, since multiple PHYs may try and create a transmit timeslot during a shared timeslot, carrier sensing may be used in some embodiments.

During bus cycle 802, PHY 1 detects transmit timeslot 826 in response to receiving a BE event 516 pulse. In response to detecting transmit timeslot 826, PHY 1 asserts transmit timeslot signaling 536, to create a transmit timeslot for its MAC to send transmit data (here, BE data). Further, PHY 1 sends announcement symbols (here a repeated 'J') during announcement portion 816 to announce (e.g., to other PHYs) that PHY 1 has claimed BE portion 806. Notably, in the example shown in FIG. 8, PHY 1 is the first PHY to receive its BE event 516 pulse. So, in theory, PHY 1 should not have to check for announcements from other PHYs before it asserts its transmit timeslot signaling 536 and sends an announcement. PHY 1 receives best effort data BE 1 from its MAC (transfer not shown) and provides BE 1 to the shared bus during BE slot 818. Upon sending BE 1, PHY 2 de-asserts its transmit timeslot signaling 536 to close the transmit timeslot for its MAC (which MAC may enter and stay in a deferral state while transmit timeslot signaling 536 is de-asserted).

During bus cycle 802, PHY 2 detects transmit TS timeslot 828 in response to receiving a BE event 516 pulse. The receipt of the BE event 516 pulse at PHY 2 is offset in time from the receipt of the BE event 516 pulse at PHY 1. Example offsets are illustrated in FIG. 8 by blocks in announcement portion 816. In this example, BE event 516 is received at PHY 1 at the beginning of the first block of announcement portion 816 and BE event 516 is received at PHY 2 beginning of the second block (i.e., after the first block) in announcement portion 816. So, in the operation contemplated in FIG. 8, upon receiving BE event 516, PHY 2 observes the announcement symbols of PHY 1 during the first block of announcement portion 816. In response to observing those announcement symbols, PHY 2 does not assert transmit timeslot signaling 536 (or stated another way, does not create a transmit timeslot for its MAC).

Turning to bus cycle 820, PHY 1 and PHY 2 send TS data during their TS timeslots, TS timeslot 826 and TS timeslot 828, respectively, and wait during the other timeslots (e.g., TS timeslot 830 and TS timeslot 832) as discussed with respect to bus cycle 802. Notably, during bus cycle 820, PHY 1 does not receive a BE event 516 pulse, and so does not detect BE timeslot 836. So, PHY 1 does not assert its transmit timeslot signaling 536, send announcement symbols, or send BE data. While not shown in FIG. 8, in other cases a pulse may be received, but ignored for priority reasons, as discussed later.

So, PHY 2 detects BE timeslot 836 upon receiving a BE event 516 pulse. PHY 2 does not observe any announcement symbols of another PHY (i.e., no announcement symbol observed at the first block of announcement portion 834). Stated another way, in response to not observing any announcement symbol, PHY 2 detects that BE slot 836 is available. In response to detecting that BE timeslot 836 is available, PHY 2 asserts its transmit timeslot signaling 536, and creates a transmit timeslot for its MAC to transmit data (here, BE data). Further, PHY 2 sends announcement symbols (here, a 'J') during announcement portion 834 to announce to other PHYs on network segment 100 that PHY 2 claimed BE portion 824. PHY 2 receives BE data BE 2 from its MAC and provides BE 2 to shared transmission medium 102 during BE slot 836. Upon sending BE 2, PHY 2 de-asserts transmit timeslot signaling 536, which ends the transmit timeslot for its MAC (which MAC may enter and stay in a deferral state while transmit timeslot signaling 536 is de-asserted).

In the foregoing discussion, transmit timeslot signaling 536 is asserted during transmit timeslots, and de-asserted otherwise. In some embodiments, emulated carrier sense signaling (e.g., emulated carrier sense signaling 612 of FIG. 6, without limitation) may be used for transmit timeslot signaling 536, in which case by convention emulated carrier sense signaling 612 would be de-asserted during an assigned transmit timeslot, and asserted otherwise.

Figure 9:
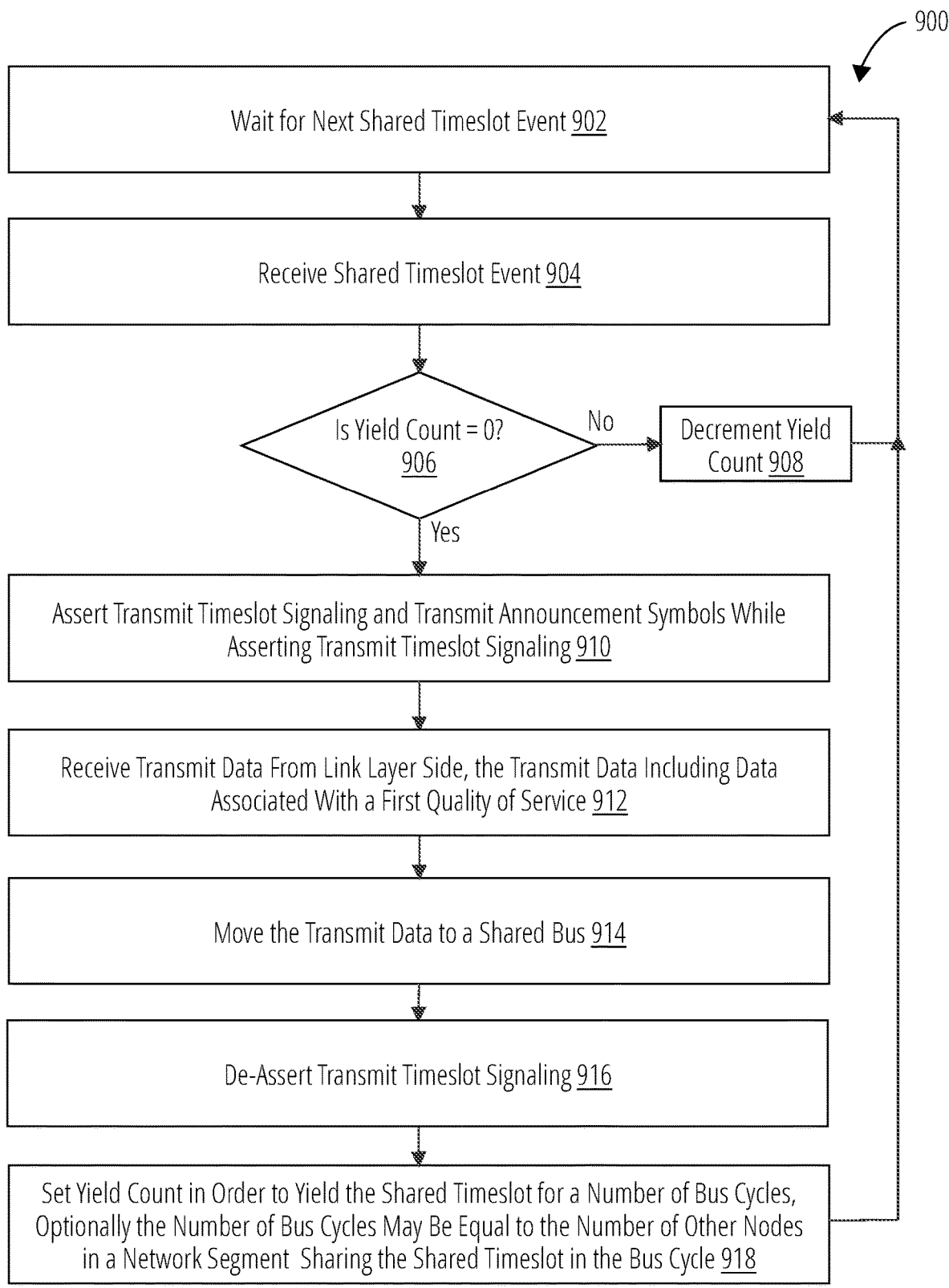
FIG. 9 illustrates a process for traffic shaping in accordance with one or more embodiments.

FIG. 9 shows a process 900 for an embodiment of a priority scheme implemented, for example, by timeslot signaling circuitry 600, and priority logic 602 more specifically.

In operation 902, process 900 waits for a next BE timeslot event (e.g., BE event 516, without limitation). In one embodiment, process 900 may receive a best effort timeslot event each bus cycle.

In operation 904, process 900 receives a BE timeslot event. In operation 906, process 900 determines if a yield count is equal to zero. In one embodiment, after claiming a BE timeslot, process 900 may wait a number of bus cycles before again claiming the BE timeslot. Process 900 may use a yield count to track a number of bus cycles since process 900 last claimed the BE timeslot. As a non-limiting example, if four nodes share a BE timeslot, then process 900 may not claim the BE timeslot for three bus cycles following a bus cycle that process 900 claimed it.

If process 900 determines in operation 906 that the yield count does not equal zero, then in operation 908, process 900 decrements the yield count and progresses to operation 902 to wait for the next BE timeslot event. If process 900 determines in operation 906 that yield count does equal zero, then in operation 910, process 900 asserts transmit timeslot signaling (e.g., de-asserts emulated carrier sense signaling, without limitation) to indicate to a MAC that a timeslot is available for sending transmit data to a shared transmission medium. While asserting (i.e., transitioning from asserted to de-asserted) transmit timeslot signaling, process 900 transmits announcement symbols to the shared transmission medium.

Notably, process 900 de-asserts transmit timeslot signaling during each of operation 902, operation 904, operation 906 and operation 908.

In operation 912, process 900 receives transmit data from a link layer, and more specifically, from the MAC. In one embodiment, the transmit data received in operation 912 includes BE data.

In operation 914, process 900 moves the transmit data received in operation 912 to the shared transmission medium. In one embodiment, the transmit data moved in operation 914 includes a prepended delimiter and/or an appended delimiter. Non-limiting examples of a delimiter include a start of stream delimiter (SSD), and an end-of-stream delimiter (ESD).

In operation 916, process 900 de-asserts transmit timeslot signaling. In one embodiment, process 900 may de-assert transmit timeslot signaling in response to finishing moving the transmit data in operation 914. In another embodiment, process 900 may de-assert transmit timeslot signaling in response to detecting an end of a BE timeslot. Notably, process 900 asserts transmit timeslot signaling during each of operation 912 and operation 914.

In operation 918, process 900 sets the yield count in order to enforce yielding of the BE timeslot for a number of bus cycles. In one embodiment, the yield count is equal to the number of other nodes sharing the BE timeslot in the network segment.

In some cases, no BE data may be received in operation 912 and operation 914, as a non-limiting example, because there is no BE data in BE queue 520. In such cases, if process 900 detects that there is no transmit data to be received, then process 900 may skip to operation 916 and de-assert transmit timeslot signaling.

In another embodiment of a priority scheme, a size of data packets transmitted by a node may be taken into account. As a non-limiting example of taking into account data packet size, if a node sends data packets that are twice as long (in bits) as other nodes then the yield count (e.g., of process 900) may be determined to be twice as long as those other nodes.

In cases where a node does not use a claimed BE timeslot, it may be desirable to restart a yielding scheme for an entire network segment so that certain nodes do not have to wait to claim a BE timeslot. Nodes in the network segment may be assigned a priority that is application specific. Stated another way, each node may be assigned a priority based on an application associated with that node or the network segment. In operation, if a node does not use a BE timeslot, then the other nodes may be configured to reset their yield count according to the specified priority.

For example, a priority may be specified as node 1, node 2, node 3, and node 4, in that order. Moreover, the network segment 100 may implement staggered BE events in that same order. If node 2 does not use its BE timeslot, upon detecting that the BE timeslot was not used during a bus cycle, node 1 may reset its count to zero, node 2 may reset its count to 1, node 3 may reset its count to 2, and node 4 may reset its counter to 3. Generally, a specified priority is a design choice that may take into account various trade-offs including, as a non-limiting example, that some nodes may claim a BE timeslot more frequently than other nodes.

Figure 10:
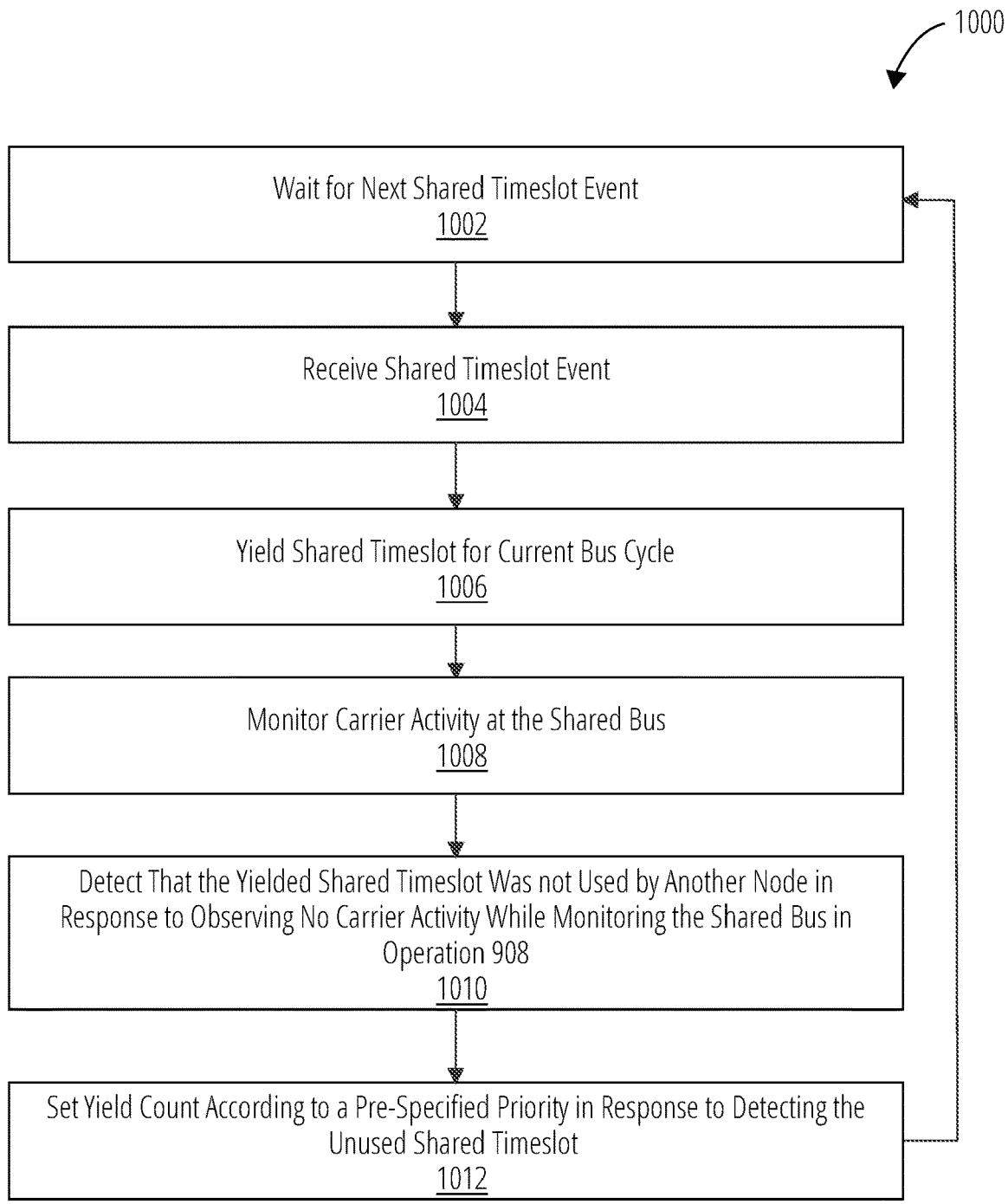
FIG. 10 illustrates a process for traffic shaping in accordance with one or more embodiments.

FIG. 10 shows a process 1000 for resetting yield according to a pre-specified priority among nodes contending for a shared BE timeslot, in accordance with one or more embodiments. In some embodiments, process 1000 may be a sub-process that is performed during one or more of operation 902, operation 904, operation 906, and operation 908 of process 900.

In operation 1002, process 1000 waits for a next BE timeslot event indicating the start of a next BE timeslot. In operation 1004, process 1000 receives a BE timeslot event. In operation 1006, process 1000 yields the next BE timeslot that was indicated by the BE timeslot event of operation 1004.

In operation 1008, process 1000 monitors carrier activity at a shared transmission medium, including during a period of time associated with the yielded BE timeslot. Carrier activity at the shared transmission medium would indicate that another node claimed the yielded BE timeslot and used it to send BE data. Additionally or alternatively, in another embodiment, process 1000 may monitor activity at a receive datapath (e.g., monitor Tx/RX Circuitry 512 of FIG. 5), during the yielded BE timeslot and observe that receive data was received or not received at the receive datapath.

In operation 1010, process 1000 detects that the yielded BE timeslot was not used by another node in response to observing no carrier activity (or additional or alternatively, in another embodiment, observing no receive datapath activity) while monitoring the shared transmission medium in operation 1008.

In operation 1012, process 1000 set the yield count according to a pre-specified priority among the nodes in the network segment, in response to detecting the unused timeslot. After setting the yield count in operation 1012, process 1000 progresses back to operation 1002, to wait for the next BE timeslot event. Notably, when the next BE timeslot event is received, the yield count will be the yield count set according to the pre-specified priority in operation 1012.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: a method of performing traffic shaping for an Ethernet network segment, the method comprising: performing transmit timeslot signaling between a physical layer and a link layer of a network segment; adjusting the transmit timeslot signaling responsive to detecting a scheduled timeslot of a bus cycle of the network segment; and performing a data transmission to a shared bus of the network segment during the scheduled timeslot.

Embodiment 2: the method according to Embodiment 1, wherein the performing the transmit timeslot signaling comprises: tuning carrier sense signaling between the physical layer and the link layer of the network segment.

Embodiment 3: the method according to any of Embodiments 1 and 2, wherein the tuning the carrier sense signaling comprises: asserting and/or de-asserting an emulated carrier sense signaling.

Embodiment 4: the method according to any of Embodiments 1 through 3, further comprising: receiving an event associated with the scheduled timeslot; and detecting the scheduled timeslot responsive to the event.

Embodiment 5: the method according to any of Embodiments 1 through 4, wherein the performing the data transmission to the shared bus of the network segment during the scheduled timeslot comprises: receiving transmit data from the link layer of the network segment; and providing the transmit data to the shared bus during the scheduled timeslot.

Embodiment 6: the method according to any of Embodiments 1 through 5, further comprising: receiving an event associated with a shared timeslot; and determining that the shared timeslot should be claimed.

Embodiment 7: the method according to any of Embodiments 1 through 6, further comprising: after performing the data transmission, yielding the shared timeslot for a number of subsequent bus cycles.

Embodiment 8: the method according to any of Embodiments 1 through 7, wherein the determining the scheduled timeslot should be claimed comprises: counting a number of bus cycles since last claiming a timeslot; and determining that the counted number of bus cycles meets a threshold.

Embodiment 9: the method according to any of Embodiments 1 through 8, further comprising: after performing the data transmission, starting a yielding of shared timeslots for a number of bus cycles.

Embodiment 10: the method according to any of Embodiments 1 through 9, comprising: detecting that a yielded timeslot was not used; and ending the yielding of the shared timeslots prior to the number of bus cycles.

Embodiment 11: the method according to any of Embodiments 1 through 10, wherein the ending the yielding of the timeslot prior to the number of bus cycles comprises resetting a yield count according to a pre-specified priority.

Embodiment 12: the method according to any of Embodiments 1 through 11, wherein the detecting that a yielded timeslot was not used comprises: observing no carrier activity at the shared bus during the yielded timeslot.

Embodiment 13: the method according to any of Embodiments 1 through 12, further comprising: synchronizing a local clock to a master clock using a precision time protocol; and using a synchronized local clock to generate events associated with a schedule of timeslots.

Embodiment 14: a physical layer device, comprising: a timeslot signaling circuitry configured to perform transmit timeslot signaling to a link layer responsive to scheduled timeslots of a bus cycle; and a transmission circuitry, the transmission circuitry configured to: receive transmit data from a link layer; and move the transmit data to a shared bus during a timeslot of the scheduled timeslots.

Embodiment 15: the physical layer device according to Embodiment 14, wherein the timeslot signaling circuitry comprises: a priority logic, the priority logic configured to determine that the timeslot should be claimed; and a tuning circuitry, the tuning circuitry configured to assert and/or de-assert emulated carrier sense signaling responsive to the priority logic.

Embodiment 16: the physical layer device according to any of Embodiments 14 and 15, wherein the priority logic is configured to determine that the timeslot should be claimed responsive to an event associated with timeslot.

Embodiment 17: the physical layer device according to any of Embodiments 14 through 16, wherein the priority logic is configured to determine that the timeslot should be claimed by: counting a number of bus cycles since last claiming the timeslot; and determine that a counted number of bus cycles meets a threshold.

Embodiment 18: the physical layer device according to any of Embodiments 14 through 17, wherein the priority logic is configured is configured to: detect that a yielded timeslot was not used; and end the yielding of the timeslot prior to the number of bus cycles.

Embodiment 19: the physical layer device according to any of Embodiments 14 through 18, wherein the ending the yielding of the timeslot prior to the number of bus cycles comprises: resetting a yield count according to a pre-specified priority.

Embodiment 20: the physical layer device according to any of Embodiments 14 through 19, wherein the timeslot signaling circuitry is configured to de-assert the transmit timeslot signaling during the timeslot for a number of bus cycles after the transmission circuitry accesses the shared bus.

Embodiment 21: the physical layer device according to any of Embodiments 14 through 20, further comprising sensing circuitry configured to provide carrier activity signaling indicative of carrier activity at a shared bus.

Embodiment 22: the physical layer device according to any of Embodiments 14 through 21, wherein the transmit signaling circuitry is configured to suppress signaling a timeslot responsive to the carrier activity signaling being indicative of carrier activity during a yielded timeslot.

Embodiment 23: the physical layer device according to any of Embodiments 14 through 22, wherein the transmit signaling circuitry is configured to detect that a yielded timeslot was not used responsive to the carrier activity signaling being indicative of no carrier activity at the shared bus during the yielded timeslot.

Embodiment 24: the physical layer device according to any of Embodiments 14 through 23, further comprising: a reception circuitry, the reception circuitry configured to move receive data from the shared bus toward the link layer, and wherein the transmit signaling circuitry is configured to suppress signaling a timeslot responsive to detecting that receive data is being moved by the reception circuitry during the timeslot.

Embodiment 25: A system for performing traffic shaping at a network segment, the system comprising: a scheduler at a link layer side of the system, the scheduler configured to generate events to indicate scheduled timeslots responsive to a synchronized local clock; a media access control unit at the link layer side of the system, the media access control unit configured to provide transmit data; and a timeslot signaling circuitry at a physical layer side of the system, the timeslot signaling circuitry configured to create transmit timeslots for the media access control unit by asserting and de-asserting emulated carrier sense signaling responsive to the generated events.

Embodiment 26: the system according to Embodiment 25, further comprising an interface arranged between the link layer side of the system and the physical layer side of the system.

Embodiment 27: the system of according to any of Embodiments 25 and 26, wherein an event path operatively coupling the timeslot signaling circuitry to the scheduler includes an interface between the link layer side and the physical layer side of the system.

Embodiment 28: the system according to any of Embodiments 25 through 27, wherein an event path operatively coupling the timeslot signaling circuitry to the scheduler does not include an interface between the link layer side and the physical layer side of the system.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method of performing traffic shaping for an Ethernet network segment, the method comprising:
   performing transmit timeslot signaling from a physical layer to a media access control unit of a link layer of a network segment;
   adjusting the transmit timeslot signaling responsive to detecting a scheduled timeslot of a bus cycle of the network segment;
   performing a data transmission to a shared bus of the network segment during the scheduled timeslot;
   after performing the data transmission, starting a yielding of shared timeslots for a number of bus cycles; and
   detecting that a yielded timeslot was not used.

2. The method of claim 1, wherein the performing the transmit timeslot signaling comprises: tuning carrier sense signaling between the physical layer and the link layer of the network segment.

3. The method of claim 2, wherein the tuning the carrier sense signaling comprises:
   asserting and/or de-asserting an emulated carrier sense signaling.

4. The method of claim 1, further comprising:
   receiving an event associated with the scheduled timeslot; and
   detecting the scheduled timeslot responsive to the event.

5. The method of claim 1, wherein the performing the data transmission to the shared bus of the network segment during the scheduled timeslot comprises:
receiving transmit data from the link layer of the network segment; and
providing the transmit data to the shared bus during the scheduled timeslot.

6. The method of claim 1, further comprising:
receiving an event associated with a shared timeslot; and
determining that the shared timeslot should be claimed.

7. A method of performing traffic shaping for an Ethernet network segment, the method comprising:
performing transmit timeslot signaling from a physical layer to a media access control unit of a link layer of a network segment;
adjusting the transmit timeslot signaling responsive to detecting a scheduled timeslot of a bus cycle of the network segment;
performing a data transmission to a shared bus of the network segment during the scheduled timeslot;
receiving an event associated with a shared timeslot; and
determining that the shared timeslot should be claimed, wherein the determining the scheduled timeslot should be claimed comprises:
counting a number of bus cycles since last claiming a timeslot; and
determining that the counted number of bus cycles meets a threshold.

8. The method of claim 1, comprising:
ending the yielding of the shared timeslots prior to the number of bus cycles.

9. The method of claim 8, wherein the ending the yielding of the shared timeslots prior to the number of bus cycles comprises resetting a yield count according to a pre-specified priority.

10. The method of claim 1, wherein the detecting that a yielded timeslot was not used comprises:
observing no carrier activity at the shared bus during the yielded timeslot.

11. The method of claim 1, further comprising:
synchronizing a local clock to a master clock using a precision time protocol; and
using a synchronized local clock to generate events associated with a schedule of timeslots.

12. A device, comprising:
a timeslot signaling circuitry, the timeslot signaling circuitry to perform transmit timeslot signaling from a physical layer device to a media access control unit of a link layer responsive to scheduled timeslots of a bus cycle, wherein the timeslot signaling circuitry comprises a priority logic to:
start a yielding of shared timeslots for a number of bus cycles; and
detect that a yielded timeslot of the shared timeslots was not used; and
a transmission circuitry, the transmission circuitry to:
receive transmit data from the link layer; and
move the transmit data toward a shared bus according to a timeslot of the scheduled timeslots.

13. The device of claim 12,
the priority logic to determine that the timeslot of the scheduled timeslots should be claimed, wherein the timeslot signaling circuitry comprises a tuning circuitry, the tuning circuitry to assert and de-assert emulated carrier sense signaling responsive to the determination by the priority logic.

14. The device of claim 13, the priority logic to determine that the timeslot should be claimed responsive to an event associated with the timeslot.

15. A device, comprising:
a timeslot signaling circuitry, the timeslot signaling circuitry to perform transmit timeslot signaling from a physical layer device to a media access control unit of a link layer responsive to scheduled timeslots of a bus cycle; and
a transmission circuitry, the transmission circuitry to:
receive transmit data from the link layer; and
move the transmit data toward a shared bus according to a timeslot of the scheduled timeslots,
wherein the timeslot signaling circuitry comprises:
priority logic to determine that a timeslot of the scheduled timeslots should be claimed; and
tuning circuitry to assert and de-assert emulated carrier sense signaling responsive to the determination by the priority logic, the priority logic to determine that the timeslot should be claimed by:
counting a number of bus cycles since last claiming the timeslot; and
determine that the counted number of bus cycles meets a threshold.

16. The device of claim 12, the priority logic to:
end the yielding of the shared timeslots prior to the number of bus cycles.

17. The device of claim 12, wherein the priority logic is to reset a yield count according to a pre-specified priority to end the yielding of the shared timeslots prior to the number of bus cycles.

18. The device of claim 12, the timeslot signaling circuitry to de-assert the transmit timeslot signaling during the timeslot of the scheduled timeslots for a number of bus cycles after the transmission circuitry accesses the shared bus.

19. The device of claim 12, further comprising sensing circuitry to provide carrier activity signaling indicative of carrier activity at the shared bus.

20. The device of claim 19, the timeslot signaling circuitry to suppress signaling a timeslot responsive to the carrier activity signaling being indicative of carrier activity at the shared bus during the yielded timeslot of the shared timeslots.

21. The device of claim 19, wherein the timeslot signaling circuitry is to detect that the yielded timeslot of the shared timeslots was not used responsive to the carrier activity signaling being indicative of no carrier activity at the shared bus during the yielded timeslot.

22. The device of claim 12, further comprising:
a reception circuitry, the reception circuitry to move receive data from the shared bus toward the link layer, and
the timeslot signaling circuitry to suppress signaling another timeslot responsive to detecting that receive data is being moved by the reception circuitry during the another timeslot.

23. A system for performing traffic shaping at a network segment, the system comprising:
a scheduler provided at a link layer side of the system, the scheduler to generate events to indicate scheduled timeslots responsive to a synchronized local clock;
a media access control unit provided at the link layer side of the system, the media access control unit to provide transmit data; and
a timeslot signaling circuitry provided at a physical layer side of the system, the timeslot signaling circuitry to create transmit timeslots for the media access control unit by asserting and de-asserting emulated carrier sense signaling responsive to the generated events, wherein the timeslot signaling circuitry comprises a priority logic to:

start a yielding of shared timeslots for a number of bus cycles; and detect that a yielded timeslot of the shared timeslots was not used.

24. The system of claim 23, further comprising an interface arranged between the link layer side of the system and the physical layer side of the system.

25. The system of claim 23, wherein an event path operatively coupling the timeslot signaling circuitry to the scheduler includes an interface between the link layer side and the physical layer side of the system.

26. The system of claim 23, wherein an event path operatively coupling the timeslot signaling circuitry to the scheduler does not include an interface between the link layer side and the physical layer side of the system.

27. The system of claim 23, the priority logic to end the yielding of the shared timeslots prior to the number of bus cycles.

* * * * *

UNITED STATES PATENT AND TRADEMARK OFFICE
CERTIFICATE OF CORRECTION

PATENT NO. : 11,398,925 B2
APPLICATION NO. : 16/674999
DATED : July 26, 2022
INVENTOR(S) : Michael Rentschler and Venkatraman Iyer It is certified that error appears in the above-identified patent and that said Letters Patent is hereby corrected as shown below:

In the Specification

| | | |
|---|---|---|
| Column 4, | Line 62, | change "802.3Cg™" to --802.3cg™-- |
| Column 10, | Line 61, | change "900 does" to --900, does-- |
| Column 11, | Line 13, | change "FIG. 8 the" to --FIG. 8, the-- |
| Column 11, | Line 25, | change "BE slot 836," to --BE timeslot 836,-- |
| Column 11, | Line 32, | change "BE slot 836." to --BE timeslot 836.-- |
| Column 11, | Line 59, | change "timeslot 808" to --TS timeslot 808-- |
| Column 11, | Line 60, | change "pulse In response to detecting transmit timeslot" to --pulse. In response to detecting transmit TS timeslot-- |
| Column 12, | Line 10, | change "transmit timeslot" to --TS timeslot-- |
| Column 12, | Line 12, | change "transmit timeslot" to --TS timeslot-- |

Signed and Sealed this
Fourteenth Day of February, 2023

Katherine Kelly Vidal
*Director of the United States Patent and Trademark Office*